United States Patent [19]

Middleton

[11] Patent Number: 4,672,680

[45] Date of Patent: Jun. 9, 1987

[54] RASTER IMAGE MANIPULATOR

[75] Inventor: Andrew J. Middleton, Malvern, England

[73] Assignee: The Secretary of State for Defence in Her Britannic Majesty's Government of the United Kingdom of Great Britain and Northern Ireland, London, England

[21] Appl. No.: 741,120

[22] Filed: Jun. 4, 1985

[30] Foreign Application Priority Data

Jun. 19, 1984 [GB] United Kingdom ................. 8415602

[51] Int. Cl.[4] .............................................. G06K 9/32
[52] U.S. Cl. .................................... 382/44; 340/727; 364/521; 382/46; 382/47
[58] Field of Search ........................ 382/44, 45, 46, 47, 382/56; 340/727; 364/521; 358/160, 140

[56] References Cited

U.S. PATENT DOCUMENTS

| | | | |
|---|---|---|---|
| 3,938,102 | 2/1976 | Morrin et al. | 382/44 |
| 3,976,982 | 8/1976 | Eiselen | 382/44 |
| 4,065,770 | 12/1977 | Berry | 358/140 |
| 4,437,121 | 3/1984 | Taylor et al. | 382/46 |
| 4,468,688 | 8/1984 | Gabriel et al. | 382/44 |
| 4,556,915 | 12/1985 | Shibuta et al. | 382/44 |

FOREIGN PATENT DOCUMENTS

| | | | |
|---|---|---|---|
| WO82/03741 | 10/1982 | World Int. Prop. O. | |
| 2130885A | 6/1984 | United Kingdom | 382/44 |
| 2145309A | 3/1985 | United Kingdom | 382/44 |

Primary Examiner—Leo H. Boudreau
Assistant Examiner—Joseph Mancuso
Attorney, Agent, or Firm—William R. Hinds

[57] ABSTRACT

A raster image manipulator includes source and destination image data stores respectively 1024×1024 and 512×512 pixels in extent. A clock and counter are employed to increment in unit steps the destination store address at which image data from the source store is to be stored. Source store addresses from which image data are obtained are calculated from precomputed shift parameters by adders arranged for cumulative addition. The shift parameters are fractional increments in source store address corresponding to unit increments in destination store address. After designating an initial source memory address, image manipulation consists of incrementation of the destination store address in unit steps with corrresponding incrementation of the source store address in shift parameter steps. The invention is capable of applying rotation, shift and X and Y magnification to image data in the source store.

4 Claims, 3 Drawing Figures

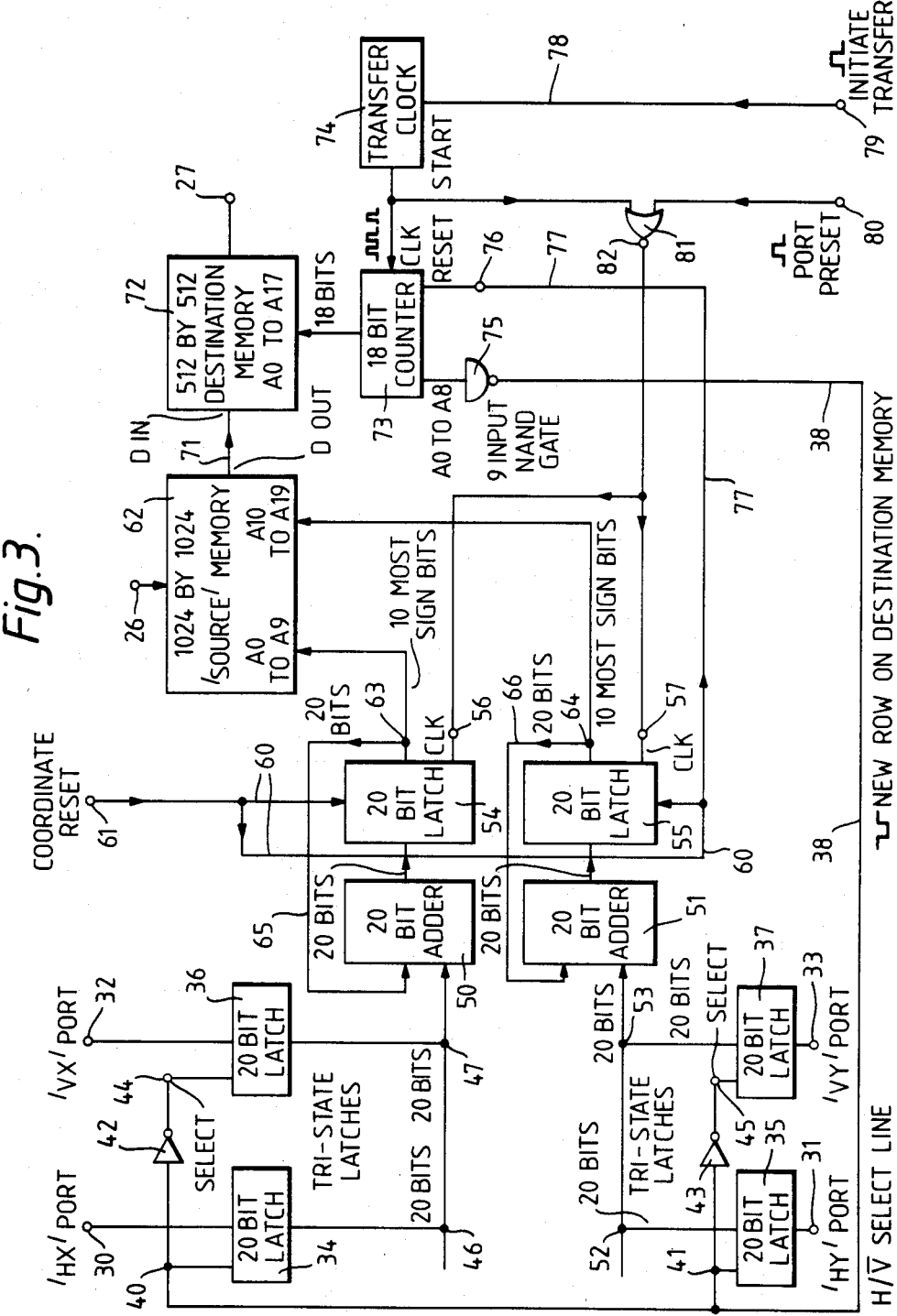

RASTER IMAGE MANIPULATOR

This invention relates to a raster image manipulator.

Raster image manipulation is well-known, and comprises the functions of image shift in X and Y directions, 'zoom' or magnification, and image rotation. Whereas image shift and zoom are comparatively straightforward, rotation is generally considered to be difficult to implement.

This difficulty is reflected by the fact that conventional image manipulation systems for aerial navigation maps employ electro-opto-mechanical devices. Such devices incorporate maps produced on photographic film, and employ optical means for image manipulation. Map storage and access facilities are undesirably bulky. Whereas digitised, electronically storable maps are currently available, existing raster graphic systems are not readily capable of coloured image manipulation at sufficient speed to simulate continuous motion to an observer.

It is an object of the present invention to provide an alternative form of raster image manipulator.

The present invention provides a raster image manipulator including:

(1) a first storage means for image data;
(2) a second storage means arranged to receive image data from the first storage means;
(3) means for selecting addresses in the second storage means; and
(4) means for furnishing the selected addresses with image data from first storage means addresses selected in accordance with a given image manipulation.

The invention provides the advantage that image manipulation is reduced to the operation of memory or data store address manipulation. In view of the comparative simplicity of this operation, the invention is capable of very high speed performance.

The first and second storage means may be digital stores. In a preferred embodiment, the means for furnishing the second storage means with image data includes:

(1) means for designating a rectangular region of an image raster for manipulation;
(2) means for computing first storage means address shift parameters corresponding to unit change in second storage means address;
(3) means for selecting a first storage means address for image data output to the second storage means; and
(4) means for incrementing the selected first storage means address with computed shift parameters in response to changes in corresponding second storage means addresses.

This embodiment provides the advantage that image manipulation is reduced to simple calculation and address incrementation. Capability of image shift, rotation and X and Y magnification is obtainable.

The rectangular region may be designated by means of a computer terminal keyboard. An operator would employ the keyboard to enter the co-ordinates of points defining the region.

An appropriately programmed computer may be employed to compute address shift parameters algebraically from entered co-ordinates. The computer may also be arranged to select an initial first storage means address for image data output to an initial second storage means address.

The invention may include a clock and a counter arranged to apply successive unit increments to second storage means addresses and to trigger corresponding shift parameter increments to first storage means addresses. The shift parameter increments may be implemented by means including an adder arranged for cumulative addition.

In order that the invention might be more fully understood, an embodiment thereof will now be described, by way of example only, with reference to the accompanying drawings, in which:

FIG. 3 is a schematic drawing of a raster image manipulator of the invention.

Figure 1:
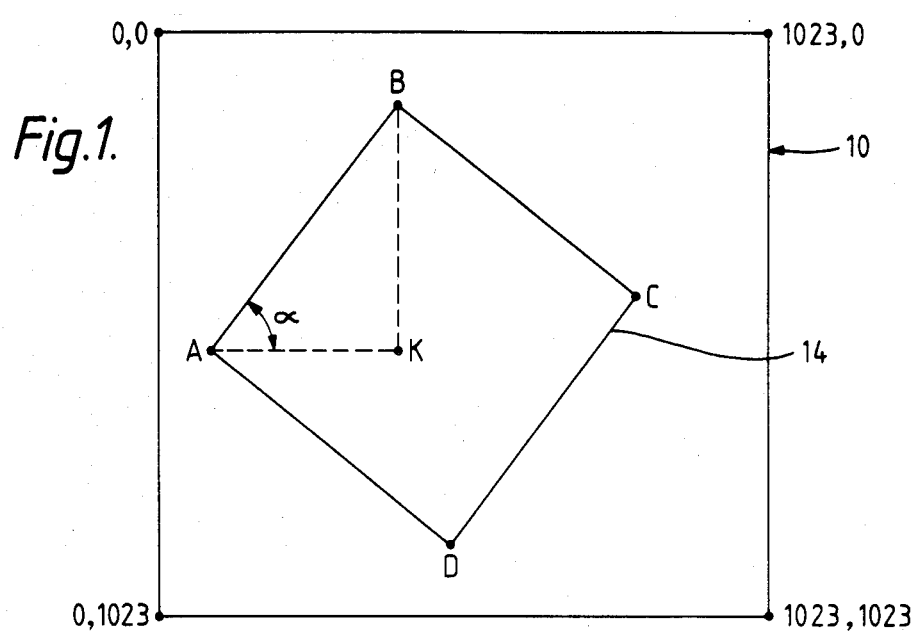
FIG. 1 illustrates image manipulation in accordance with the invention.

Referring to FIG. 1, there are schematically shown source and destination image planes 10 and 12. The planes 10 and 12 may be considered as representing visual displays of an image before and after manipulation, or the equivalent located in electronic stores or memories. The source plane 10 is a 1024×1024 pixel array containing a rectangular mapping region 14 having vertices A, B, C and D. The destination plane is a 512×512 pixel array into which it is required to map the region 14. This entails rotation through an angle α between lines AB and AK, where K is the intersection of a horizontal line through vertex A and a vertical line through vertex B. In additon, magnification by differing factors is required in the X and Y directions.

Figure 2:
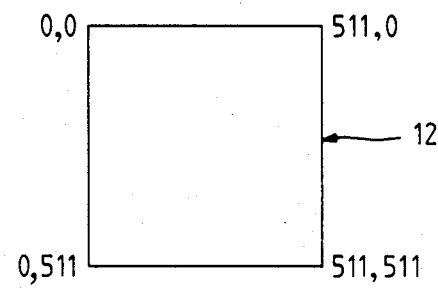
FIG. 2 is a schematic block diagram of an image manipulation system.
Figure 2:
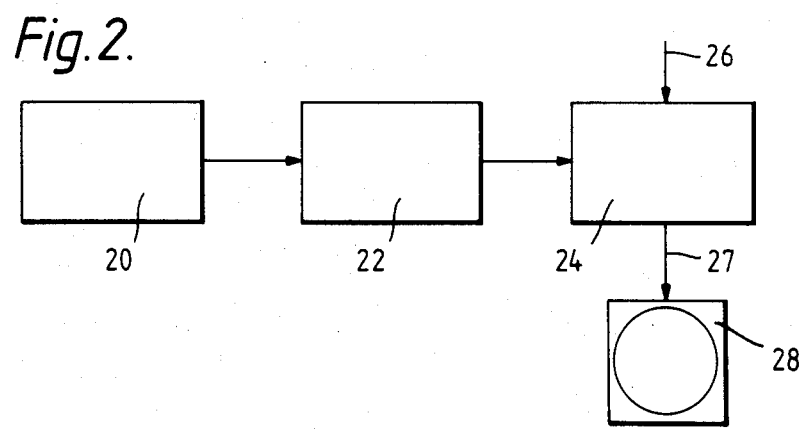

Referring now to FIG. 2, there is shown a schematic functional block diagram of a raster image manipulator system. The system comprises a computer terminal keyboard 20 for designating regions for manipulation purposes. The keyboard 20 is connected to a computer 22 itself connected to a raster image processor 24. The processor 24 has a raster image input bus 26 and is connected by a bus 27 to a visual display unit 28.

The image processor 24 is shown in greater detail in FIG. 3, in which circuit connections shown as single lines represent buses of appropriate bit width in each case. First store address shift or image transfer parameters $H_x$, $H_y$, $V_x$ and $V_y$ are calculated by the computer 22, as will be described later, and are fed to respective inputs 30, 31, 32 and 33. The inputs 30 to 33 are connected to respective tri-state 20-bit input latches 34 to 37. An $H/\overline{V}$ select line 38 is connected directly to the select inputs 40 and 41 of latches 34 and 35, and indirectly via respective inverters 42 and 43 to the select inputs 44 and 45 of latches 36 and 37. The outputs 46 and 47 of the latches 34 and 36 are connected to a 20-bit adder 50. A second 20-bit adder 51 is connected to the outputs 52 and 53 of latches 35 and 37. The adders 50 and 51 are connected to respective 20-bit latches 54 and 55 having clock inputs 56 and 57. Reset lines 60 connect both latches 54 and 55 to a co-ordinate reset input 61. A 1024 by 1024 first store or source memory 62 has address inputs $A_0$ to $A_9$ connected to the output 63 of latch 54, and address inputs $A_{10}$ to $A_{19}$ connected to the output 64 of latch 55. The memory 62 receives only the 10 most significant bits of each of the 20-bit outputs 63 and 64. Respective 20-bit feedback buses 65 and 66 connect latch outputs 63 and 64 to second inputs of the adders 50 and 51.

The source memory 62 has pixel intensity input and output lines 26 and 71. Line 71 is connected to a 512 by 512 second store or destination memory 72 having address inputs $A_0$ to $A_{17}$ connected to an 18-bit counter 73. The counter 73 is arranged to count clock pulses from a transfer clock 74, and has cumulative count outputs $A_0$ to $A_8$ connected to the inputs of a 9-bit NAND gate 75. The clock 74 is arranged to count up to 262,143 ($512^2 - 1$) and then stop. A counter reset input 76 is connected by lines 77 and 60 to co-ordinate reset input 61.

Initiation/reset of the clock 74 is provided for by a line 78 connected to an initiate transfer input 79. Signals from the clock 74 and port preset input 80 pass as inputs to an OR gate 81. The output 82 of the OR gate 81 is connected to the clock inputs 56 and 57 of latches 54 and 55.

The arrangement described with reference to FIGS. 1, 2 and 3 operates as follows. The keyboard 20 is activated by an operator to furnish the computer 22 with the co-ordinates of three of the vertices of the rectangle in the source place or original image which is to be transferred or mapped into the destination plane. The computer then calculates the transfer parameters $H_x$, $H_y$, $V_x$ and $V_y$. The computer programme required for this is elementary and will not be described. The approach to the transfer operation is to select each pixel in the destination plane in turn, and to assign to it the intensity of the respective most closely corresponding source pixel. The first pixel in the destination plane has co-ordinates 0,0 and is assigned the intensity of source point A. The second first row pixel at 1, 0 corresponds to a source plane position having co-ordinates $A_x + H_x$, $A_y + H_y$.

$H_x$, $H_y$ are column shift parameters given by:

$H_x$ = fractional change in source pixel X co-ordinate corresponding to a one pixel change in position along a destination memory row.

i.e. $H_x = \dfrac{\text{Total change in source } X \text{ co-ordinate along } AB}{\text{Total number of pixels in a destination row}} = \dfrac{B_x - A_x}{511}$ (1)

$H_y$ = Equivalent of $H_x$ for Y co-ordinate = $\dfrac{B_y - A_y}{511}$ (2)

In Equations (1) and (2), $A_x$, $A_y$, $B_x$, $B_y$ are the source plane co-ordinates of the points A and B respectively. The source pixel co-ordinates corresponding to the nth pixel in the first destination row are:

$A_x + (n-1)H_x$, $A_y + (n-1)H_y$, where $n = 1$ to 512 (3)

Source plane pixel intensities are assigned to each first row destination plane pixel in turn, as will be described in more detail later. At the end of a row, it is necessary to carry out the equivalent of a row shift and return operation to reach the source plane pixel corresponding to the first pixel in the second destination plane row. The co-ordinates of the source pixel corresponding to the final first row destination plane pixel at 511, 0 are from (3):

$A_x + 511H_x$, $A_y + 511H_y$ (4)

To execute the row shifts and return operation, row shift parameters $V_x$, $V_y$ are defined such that the source plane pixel co-ordinates $A'_x$, $A'_y$ corresponding to the second row, first column destination plane pixel at 0, 1 are given by adding $V_x$, $V_y$ to the co-ordinates at (4) above.

i.e. $A'_x = A_x + 511H_x + V_x$ (5.1)

$A'_y = A_y + 511H_y + V_y$ (5.2)

$V_x = A'_x - A_x - 511H_x$ (6.1)

$V_y = A'_y - A_y - 511H_y$ (6.2)

i.e. $V_x = \dfrac{D_x - A_x}{511} - 511H_x$ (7.1)

and $V_y = \dfrac{D_y - A_y}{511} - 511H_y$ (7.2)

The parameters $H_x$, $H_y$, $V_x$, $V_y$ incorporate image shift and rotation together with X and Y magnification. They are to be employed in a manner which renders errors cumulative. To obtain a maximum error of less than half a pixel in 511 pixels, accuracy to 1 in $10^6$ is required.

In practice the computer 22 calculates each of the transfer parameters in 21 bit twos complement form, the most significant bit (msb) being a sign bit. This msb is then discarded before input to the relevant port 30 to 33. This is valid since Equations (5) to (7) were derived on the basis that a positive address would result. Accordingly, the sign bit of any cumulative addition by adders 50 and 51 must be zero. In cases where $V_x$ or $V_y$ is negative, the result of evaluating Equation (5) to 21 bits would be to produce a carry bit to reduce the most significant or sign bit to zero. It is therefore unnecessary to provide for 21 bit computation within the FIG. 3 arrangement to produce 20 bit accuracy.

Calculation of $H_x$, $H_y$, $V_x$ and $V_y$ to twenty bits ensures that incremental results $511H_{x,y}$ (final column) and $511V_{x,y}$ (final row) are accurate to better than one pixel. It should be noted that errors in $H_x/H_y$ and $V_x/V_y$ are separately but not jointly cumulative, since the Equations (7) expressions for $V_{x,y}$ remove accumulated errors in $H_{x,y}$. To carry out the image transfer operation, image data is loaded at 26 into source memory 62. The computer 22 sets co-ordinate reset input 61 momentarily high to reset latches 54 and 55 and counter 73 to zero. It then applies the co-ordinates $A_x$ and $A_y$ to inputs 30 and 31 of latches 34 and 35. Now the output of NAND gate 75 is high, since outputs $A_0$ to $A_8$ of counter 73 are low. H/$\overline{V}$ select line 38 is accordingly at high potential, so latches 34 and 35 provide output of $A_x$ and $A_y$ to adders 50 and 51. Latch outputs 63 and 64 are zero by virtue of co-ordinate reset, and accordingly adders 50 and 51 add zero to $A_x$ and $A_y$. Latches 54 and 55 are therefore presented with $A_x$ and $A_y$ respectively. The computer 22 then pulses port preset 80 momentarily high providing a clock signal to latches 54 and 55 via OR gate 81. This presents the first ten bits of each of $A_x$ and $A_y$ to respective address inputs of source memory 62. Memory 62 accordingly outputs to destination memory 72 the intensity of the source plane pixel corresponding to the first row, first column destination plane pixel (co-ordinates 0,0). By virtue of co-ordinate reset, all outputs of counter 73 are zero, so destination memory address inputs $A_0$ to $A_{18}$ are zero. The input pixel intensity at $A_x$, $A_y$ in the source plane is accordingly allocated to 18-bit address 0 ... 0. Destination memory 72 is arranged for serial row storage, i.e. the mth pixel in the nth destination row is associated with the address $512(n-1)+(m-1)$ expressed in 18 bits.

Having initially arranged for the first destination plane pixel to be associated with the correct source plane pixel intensity, the computer applies the transfer parameters $H_x$, $H_y$, $V_x$, $V_y$ to inputs 30 to 33 respectively. H/V select line 38 remains at high potential operating latches 34 and 35. $H_x$ and $H_y$ are accordingly input to adders 50 and 51 for addition to all 20 bits of $A_x$ and $A_y$ fed back via buses 65 and 66. Latches 54 and 55 accordingly receive input of $A_x+H_x$ and $A_y+H_y$ respectively. The computer 22 now pulses input 79 momentarily high to start transfer clock 74. The first clock pulse passes via OR gate 81 to operate latches 54 and 55 and provide the first ten bits of each of $A_x+H_x$ and $A_y+H_y$ as address inputs to source memory 62. This addresses a second source plane pixel intensity for transfer to destination memory 72. The counter 73 has now counted the first clock pulse from clock 74, and has a least significant bit at logic 1 with all other bits zero. It accordingly provides an 18 bit cumulative count output of 0 ... 01 as address to destination memory 72. This allocates the second pixel intensity to the first row, second column (co-ordinates 1,0) in the destination plane.

On the second clock cycle, counter 73 indicates an 18 bit cumulative count output of 0 ... 010, and the output of NAND gate 75 remains high for operation of latches 34 and 35. Cumulative addition by adders 50 and 51 proceeds to produce the first ten bits of $A_x+2H_x$ and $A_y+2H_y$ presented as address inputs to source memory 62. This produces a third pixel intensity for allocation to the first row, third column location at 2, 0 in the destination plane. By induction, on the nth clock cycle the intensity of the source plane pixel having co-ordinates $A_x+(n-1)H_x$, $A_y+(n-1)H_y$ is assigned to the first row, nth column destination plane pixel, i.e. co-ordinates $n-1, 0$.

Incrementation of source memory addresses in steps of $H_x$ and $H_y$ and of the destination memory address by unit steps continues until $n=511$, when the first destination plane row becomes filled. Counter 73 indicates a cumulative count of 511, i.e. its nine least significant bits are at logic 1. This produces a logic 0 or low output from NAND gate 75 for one clock cycle. Accordingly, latch select inputs 40 and 41 become low, and by virtue of inverters 42 and 43, latch select inputs 44 and 45 become high. This operates latches 36 and 37, providing $V_x$ and $V_y$ (instead of $H_x$ and $H_y$) to adders 50 and 51 for addition to the cumulative sums $A_x+511H_x$ and $A_y+511H_y$. When clocked on the subsequent or 512th clock cycle, latches 54 and 55 accordingly provide the first ten bits of each of $A_x+511H_x+V_x$ and $A_y+511H_y+V_y$ to address inputs of source memory 62. This executes the row shift and return operation as defined in Equations (5.1) and (5.2) in respect of the source plane intensity is allocated to the 513th destination place pixel, i.e. the pixel in the second row, first column with co-ordinates 0,1.

The 512th clock cycle also returns the output of NAND gate 75 to high potential, since its inputs and the nine least significant bits of counter 73 have become zero. Source memory address increments of $H_x$ and $H_y$ are accordingly resumed together with destination memory increments of unity. Increments of $H_x$ and $H_y$ continue to be added until the 1023rd clock cycle. This fills the second destination row, and sets the nine least significant bits of the output of counter 73 to logic 1 a second time. The output of NAND gate 75 therefore moves low a second time to implement a second row shift and return or $V_x/V_y$ increment. $H_x/H_y$ increments are resumed on subsequent clock cycles to fill the third destination plane row. By induction, $V_x/V_y$ increments are applied after every row is filled (except the 512th), i.e. after 511 successive increments of $H_x$ and $H_y$. After all 512 rows of the destination memory 72 have been filled, the transfer clock has produced $512^2-1$ pulses, and then stops. At this point, the destination memory 72 contains all pixel intensity data from the source plane region ABCD. The memory 72 may now be treated as a frame store for visual display unit, and the magnified and rotated image data stored therein displayed in the conventional way through the interface bus 27.

To exemplify transfer of a specific source plane, consider the points A, B, C and D having coordinates set out in Table 1:

TABLE 1

| Point | Source Coordinates | | Destination Coordinates | |
|---|---|---|---|---|
| | X | Y | X | Y |
| A | 100 | 400 | 0 | 0 |
| B | 390 | 90 | 511 | 0 |
| C | 612 | 307 | 511 | 511 |
| D | 322 | 617 | 0 | 511 |

From Equations (1), (2), (7.1) and (7.2) after binary truncation:

$H_x = 0.56738$,
$H_y = -0.60645$
$V_x = -289.49805$,
$V_y = 310.31738$

From the above values of the transfer parameters, Table 2 provides the addresses of the first eleven pixels in the first destination row, i.e. coordinates x, y where $y=0$ and $x=0$ to 10, together with corresponding calculated source addresses. The source addressed are shown both as calculated to the decimal equivalent of twenty-bit accuracy and rounded down or truncated to whole pixel numbers. Table 3 shows the equivalent for the first eleven pixels of the first destination column, i.e. $x=0$ and $y=0$ to 10. These tables illustrate the addressing of successive destination pixels and their association with respective most nearly corresponding source plane pixels. It will be apparent that a unit change in the X or Y destination plane coordinate does not necessarily imply a unit change in the corresponding source plane coordinate.

TABLE 2

| Source address X, Y | Truncated source address X, Y | Destination address X, Y |
|---|---|---|
| 100.000 400.000 | 100, 400 | 0, 0 |
| 100.567 399.394 | 100, 399 | 1, 0 |
| 101.135 398.787 | 101, 398 | 2, 0 |
| 101.702 398.181 | 101, 398 | 3, 0 |
| 102.270 397.574 | 102, 397 | 4, 0 |
| 102.837 396.968 | 102, 396 | 5, 0 |
| 103.404 396.361 | 103, 396 | 6, 0 |
| 103.972 395.755 | 103, 395 | 7, 0 |
| 104.539 395.148 | 104, 395 | 8, 0 |
| 105.106 394.542 | 105, 394 | 9, 0 |
| 105.674 393.936 | 105, 393 | 10, 0 |

TABLE 3

| Source address X, Y | Truncated source address X, Y | Destination address X, Y |
| --- | --- | --- |
| 100.000 400.000 | 100, 400 | 0, 0 |
| 100.435 400.425 | 100, 400 | 0, 1 |
| 100.869 400.849 | 100, 400 | 0, 2 |
| 101.304 401.274 | 101, 401 | 0, 3 |
| 101.738 401.699 | 101, 401 | 0, 4 |
| 102.173 402.123 | 102, 402 | 0, 5 |
| 102.607 402.548 | 102, 402 | 0, 6 |
| 103.042 402.973 | 103, 402 | 0, 7 |
| 103.477 403.397 | 103, 403 | 0, 8 |
| 103.911 403.822 | 104, 403 | 0, 9 |
| 104.346 404.247 | 104, 404 | 0, 10 |

As has been described, the designation of an area of a source plane may be carried out with the aid of a keyboard to enter the coordinates of rectangle vertices. As is well-known in the art of electronics, a computer interactive probe may alternatively be employed to indicate points on a visual display.

The invention has been described in terms of unit increments in destination addresses corresponding to non-unit increments in source addresses. This can of course be inverted so that unit or integer source address increments correspond to non-unit destination addresses increments. The addressing devices for memories 62 and 72 would then be exchanged. Such an arrangement would be useful for situations in which the destination image is to be a reduced version of the source image. A particular instance of this would be a source image containing fine structure such as a line pattern. Using the previous embodiment of unit destination address increments, some of the lines would be omitted on a random basis and the pattern would partially disappear. If instead mapping were to be performed with unit source/non-unit destination address increments, lines need not be lost; indeed artificial line thickening could be acheived by transferring composite pixel values each a function of two or more source pixel intensities.

As has been said, the destination memory could be a raster image display device such as a CRT. Information from the source memory would be fed to the CRT at a rate appropriate for the CRT's line and frame scans. The source memory could also be a CRT. A known form of CRT has a faceplate covered by a fine matrix of conducting plates each insulated from its neighbours. An image on the CRT produces a charge image on the plates which is subsequently interrogated. In accordance with the invention, the interrogation would be controlled so that pixel intensities required for a given image manipulation would be read out in the appropriate sequence.

I claim:
1. A raster image manipulator including:
   (1) a first storage means for image data,
   (2) a second storage means arranged to receive image data from the first storage means,
   (3) means for establishing coordinates including a start address and defining an image area for transfer between the storage means,
   (4) means for deriving column and row shift parameters from the said coordinates to define an image manipulation, these parameters both incorporating X and Y address shift components and providing address increments for one storage means corresponding to integer address increments in the other storage means as appropriate for image manipulation,
   (5) a clock-activated counter arranged to address the said other storage means repetitively with integer address increments, and
   (6) clock-activated adding means arranged to increment the said start address in shift parameter steps in synchronism with counter addressing, and thereby to generate successive addresses for the said one storage means implementing image data transfer in accordance with the said manipulation.
2. A raster image manipulator according to claim 1 wherein the means for deriving shift parameters is arranged to produce parameter accuracy sufficient to enable addressing in shift parameter steps to be performed to a maximum error of less than a unit address increment, and wherein the adding means has a bit width large enough to accommodate the said shift parameter accuracy, but is arranged to provide addresses from which lower order bits corresponding to fractional parts are omitted.
3. A raster image manipulator according to claim 2 including gating means arranged to indicate to the adding means filling of successive storage means rows, and wherein the adding means is arranged for address incrementation in either row or column shift parameter steps in accordance respectively with whether or not a gating means indication of row filling has been received.
4. A raster image manipulator according to claim 1 including gating means arranged to indicate to the adding means filling of successive storage means rows, and wherein the adding means is arranged for address incrementation in either row or column shift parameter steps in accordance respectively with whether or not a gating means indication of row filling has been received.

* * * * *